(12) United States Patent
Scipioni

(10) Patent No.: US 9,460,411 B2
(45) Date of Patent: Oct. 4, 2016

(54) SECURE PACKAGE DELIVERY

(71) Applicant: PAYPAL, INC., San Jose, CA (US)

(72) Inventor: German Scipioni, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 290 days.

(21) Appl. No.: 14/017,116

(22) Filed: Sep. 3, 2013

(65) Prior Publication Data

US 2015/0066799 A1    Mar. 5, 2015

(51) Int. Cl.
*G06F 17/00* (2006.01)
*G06Q 10/08* (2012.01)

(52) U.S. Cl.
CPC ................................. *G06Q 10/083* (2013.01)

(58) Field of Classification Search
CPC .............. G06Q 10/083; G06Q 10/08; G06Q 10/0835; G06Q 20/40; G06F 21/64; G06F 21/32; G06F 17/30247; G06F 1/1626; G06F 17/30861; G06F 17/30; H04L 29/06; H04L 1/0002; H04M 7/006
See application file for complete search history.

(56) References Cited

U.S. PATENT DOCUMENTS

| | | | |
|---|---|---|---|
| 8,645,227 B2* | 2/2014 | Owen | G06Q 20/12 705/26.43 |
| 2004/0049401 A1* | 3/2004 | Carr et al. | 705/1 |
| 2006/0156029 A1* | 7/2006 | Algazi et al. | 713/186 |
| 2010/0076903 A1* | 3/2010 | Klingenberg | G06Q 10/08 705/333 |
| 2014/0059693 A1* | 2/2014 | Stecher | H04L 63/0421 726/26 |
| 2014/0201100 A1* | 7/2014 | Rellas et al. | 705/330 |

* cited by examiner

*Primary Examiner* — Ariel Mercado
(74) *Attorney, Agent, or Firm* — Haynes and Boone, LLP

(57) ABSTRACT

Methods and systems for facilitating delivery of a package to a customer are described. The methods include receiving a delivery order, the order including a signature requirement; requesting a visual identification of an authorized receiver of the package from a user; receiving the visual identification from the user; and transmitting the visual identification to a shipping carrier.

20 Claims, 3 Drawing Sheets

SECURE PACKAGE DELIVERY

BACKGROUND

1. Field of the Invention

The present invention generally relates to shipping and delivering a package to a customer.

2. Related Art

As a result of the Internet, many merchants who have a physical presence (e.g., a store in a mall) also have created websites to sell the products they offer over the Internet. In addition, many new merchants have created websites to sell their products only over the Internet and not in a physical store. To buy a product from these merchants, a customer may visit the merchant's website, select the products that the customer wants to buy, and provide certain information (e.g., name, address, and financial information) to the merchant. After the merchant verifies the customer's information, the merchant may send the product to the customer via a shipper (e.g., United States Postal Service (USPS), Federal Express, and United Postal Service (UPS)).

When the product is expensive, the merchant or customer may request that a signature be obtained upon delivery of the package, to ensure that the package is received. Often, when the shipper arrives to deliver the package, there is no one to sign for and receive the package, or the person present is not old enough to receive the package. Thus, the shipper is unable to deliver, and the customer must reschedule the delivery or go to a local office of the shipper to pick up the package. Other times, the person signing for the delivery is not authorized to receive the package and takes the package intended for the customer.

Thus, a need exists for systems and methods that are more efficient and convenient for both the customer and the shipper.

Figure 1:
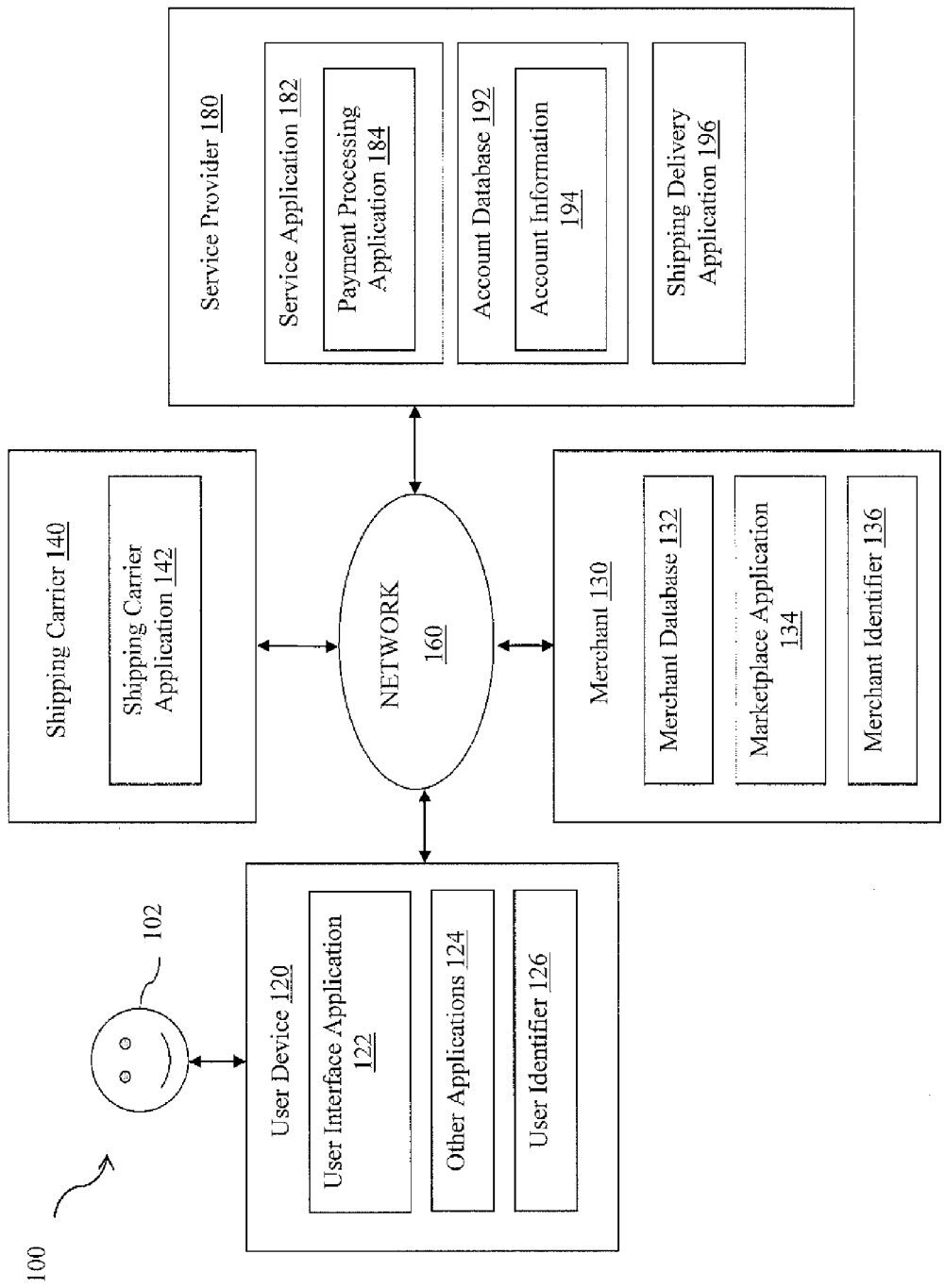
FIG. 1 is a block diagram illustrating a system for facilitating delivery of a package according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes the use of visual identification to facilitate the delivery of a package to a user. A user browses items online, makes a purchase, and requests a delivery with a signature confirmation. The merchant receives the order and provides the necessary user information to a shipping carrier to deliver the package. The shipping carrier then transmits the order and delivery information to a service provider. The service provider requests and receives a visual identification of an authorized receiver of the package from the user. The service provider then transmits the visual identification to the shipping carrier, who can use the visual identification to ensure delivery is made to the correct person.

FIG. 1 shows one embodiment of a block diagram of a network-based system 100 adapted to facilitate the delivery of a package to a user. As shown, system 100 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

As shown in FIG. 1, the system 100 includes a user device 120 (e.g., a smartphone), one or more merchant servers or devices 130 (e.g., network server devices), and at least one service provider server or device 180 (e.g., network server device) in communication over the network 160. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet. As such, in various embodiments, the user device 120, merchant servers or devices 130, and service provider server or device 180 may be associated with a particular link (e.g., a link, such as a URL (Uniform Resource Locator) to an IP (Internet Protocol) address).

The user device 120, in various embodiments, may be implemented using any appropriate combination of hardware and/or software configured for wired and/or wireless communication over the network 160. The user device 120, in one embodiment, may be utilized by the user 102 to interact with the service provider server 180 over the network 160. For example, the user 102 may conduct financial transactions (e.g., account transfers) with the service provider server 180 via the user device 120, or send and receive information from the service provider server 180. In various implementations, the user device 120 may be implemented as a personal computer (PC), a smart phone, personal digital assistant (PDA), laptop computer, and/or other types of computing devices capable of transmitting and/or receiving data.

The user device 120, in one embodiment, includes a user interface application 122, which may be utilized by the user 102 to conduct transactions (e.g., shopping, purchasing, bidding, etc.) with the merchant server or device 130 or with the service provider server 180 over the network 160. In one aspect, purchase expenses may be directly and/or automatically debited from an account related to the user 102 via the user interface application 122.

In one implementation, the user interface application 122 comprises a software program, such as a graphical user interface (GUI), executable by a processor that is configured to interface and communicate with the service provider server 180 via the network 160. In another implementation, the user interface application 122 comprises a browser module that provides a network interface to browse information available over the network 160. For example, the user interface application 122 may be implemented, in part, as a web browser to view information available over the network 160.

In an example, the user 102 is able to access merchant websites via the one or more merchant servers 130 to view and select items for purchase, and the user 102 is able to purchase items from the one or more merchant servers 130 via the service provider server 180. Accordingly, in one or more embodiments, the user 102 may conduct transactions (e.g., purchase and provide payment for one or more items) from the one or more merchant servers 130 via the service provider server 180.

The user device 120, in various embodiments, may include other applications 124 as may be desired in one or more embodiments of the present disclosure to provide additional features available to user 102. In one example, such other applications 124 may include security applications for implementing client-side security features, programmatic client applications for interfacing with appropriate application programming interfaces (APIs) over the network 160, and/or various other types of generally known programs and/or software applications. In still other examples, the other applications 124 may interface with the user interface application 122 for improved efficiency and convenience.

The user device 120, in one embodiment, may include at least one user identifier 126, which may be implemented, for example, as operating system registry entries, cookies associated with the user interface application 122, identifiers associated with hardware of the user device 120, or various other appropriate identifiers. The user identifier 126 may include one or more attributes related to the user 102, such as personal information related to the user 102 (e.g., one or more user names, passwords, photograph images, biometric IDs, addresses, phone numbers, etc.) and banking information and/or funding sources (e.g., one or more banking institutions, credit card issuers, user account numbers, security data and information, etc.). In various implementations, the user identifier 126 may be passed with a user login request to the service provider server 180 via the network 160, and the user identifier 126 may be used by the service provider server 180 to associate the user 102 with a particular user account maintained by the service provider server 180.

The user device 120, in one embodiment, includes a geo-location component adapted to monitor and provide an instant geographical location (i.e., geo-location) of the user device 120. In one implementation, the geo-location of the user device 120 may include global positioning system (GPS) coordinates, zip-code information, area-code information, street address information, and/or various other generally known types of geo-location information. In one example, the geo-location information may be directly entered into the user device 120 by the user 102 via a user input component, such as a keyboard, touch display, and/or voice recognition microphone. In another example, the geo-location information may be automatically obtained and/or provided by the user device 120 via an internal or external GPS monitoring component. In one aspect, when interfacing with the user device 120, the user 102 may elect to provide or may be prompted to provide permission for the release of geo-location information. Accordingly, the user 102 may have exclusive authority to allow transmission of geo-location information from the user device 120 to the one or more merchant servers 130 and/or the service provider server 180. In any instance, the one or more merchant servers 130 and/or the service provider server 180 may communicate with the user device 120 via the network 160 and request permission to acquire geo-location information from the user device 120.

The one or more merchant servers 130, in various embodiments, may be maintained by one or more business entities (or in some cases, by a partner of a business entity that processes transactions on behalf of business entities). Examples of businesses entities include merchant sites, resource information sites, utility sites, real estate management sites, social networking sites, etc., which offer various items for purchase and payment. In some embodiments, business entities may need registration of the user identity information as part of offering the items to the user 102 over the network 160. As such, each of the one or more merchant servers 130 may include a merchant database 132 for identifying available items, which may be made available to the user device 120 for viewing and purchase by the user 102. In one or more embodiments, user 102 may complete a transaction such as purchasing the items via service provider server 180.

Each of the merchant servers 130, in one embodiment, may include a marketplace application 134, which may be configured to provide information over the network 160 to the user interface application 122 of the user device 120. For example, user 102 may interact with the marketplace application 134 through the user interface application 122 over the network 160 to search and view various items available for purchase in the merchant database 132.

Each of the merchant servers 130, in one embodiment, may include at least one merchant identifier 136, which may be included as part of the one or more items made available for purchase so that, e.g., particular items are associated with particular merchants. In one implementation, the merchant identifier 136 may include one or more attributes and/or parameters related to the merchant, such as business and banking information. In various embodiments, user 102 may conduct transactions (e.g., searching, selection, monitoring, purchasing, and/or providing payment for items) with each merchant server 130 via the service provider server 180 over the network 160.

A merchant website may also communicate (for example, using merchant server 130) with the service provider through service provider server 180 over network 160. For example, the merchant website may communicate with the service provider in the course of various services offered by the service provider to merchant website, such as payment intermediary between customers of the merchant website and the merchant website itself. For example, the merchant website may use an application programming interface (API) that allows it to offer sale of goods in which customers are allowed to make payment through the service provider, while user 102 may have an account with the service provider that allows user 102 to use the service provider for making payments to merchants that allow use of authentication, authorization, and payment services of service provider as a payment intermediary. The merchant website may also have an account with the service provider.

The service provider server 180, in one embodiment, may be maintained by a transaction processing entity, which may provide processing for financial transactions and/or information transactions between the user 102 and one or more of the merchant servers 130. As such, the service provider server 180 includes a service application 182, which may be adapted to interact with the user device 120 and/or each merchant server 130 over the network 160 to facilitate the searching, selection, purchase, and/or payment of items by the user 102 from one or more of the merchant servers 130. In one example, the service provider server 180 may be provided by PayPal®, Inc., eBay® of San Jose, Calif., USA, and/or one or more financial institutions or a respective intermediary that may provide multiple point of sale devices at various locations to facilitate transaction routings between merchants and, for example, financial institutions.

The service application 182, in one embodiment, utilizes a payment processing application 184 to process purchases and/or payments for financial transactions between the user 102 and each of the merchant servers 130. In one implementation, the payment processing application 184 assists with resolving financial transactions through validation, delivery, and settlement. As such, the service application 182 in conjunction with the payment processing application 184 settles indebtedness between the user 102 and each of the merchants 130, wherein accounts may be directly and/or automatically debited and/or credited of monetary funds in a manner as accepted by the banking industry.

The service provider server 180, in one embodiment, may be configured to maintain one or more user accounts and merchant accounts in an account database 192, each of which may include account information 194 associated with one or more individual users (e.g., user 102) and merchants (e.g., one or more merchants associated with merchant servers 130). For example, account information 194 may include private financial information of user 102 and each merchant associated with the one or more merchant servers 130, such as one or more account numbers, passwords, credit card information, banking information, or other types of financial information, which may be used to facilitate financial transactions between user 102, and the one or more merchants associated with the merchant servers 130. In various aspects, the methods and systems described herein may be modified to accommodate users and/or merchants that may or may not be associated with at least one existing user account and/or merchant account, respectively.

In one implementation, the user 102 may have identity attributes stored with the service provider server 180, and user 102 may have credentials to authenticate or verify identity with the service provider server 180. User attributes may include personal information, banking information and/or funding sources as previously described. In various aspects, the user attributes may be passed to the service provider server 180 as part of a login, search, selection, purchase, and/or payment request, and the user attributes may be utilized by the service provider server 180 to associate user 102 with one or more particular user accounts maintained by the service provider server 180.

In one embodiment, the shipping delivery application 196 communicates with a shipping carrier. The application 196 determines the requirements for delivery (e.g., a signature at the time of delivery), receives visual identification of an authorized receiver for the delivery, and transmits the visual identification to the shipping carrier. The visual identification includes an image of at least the face of the authorized receiver. Upon receipt of the visual identification, the shipping carrier can identify that the receiver receiving the package and the authorized receiver match. This prevents the package from being stolen or re-routed to another destination.

In some embodiments, the shipping delivery application 196 receives item and shipment information directly from the merchant server 130. In these cases, the service provider acts as the shipping carrier and delivers the package to the user.

In various embodiments, the shipping delivery application 196 provides flexibility in the delivery of an item ordered on the online marketplace. For example, the shipping delivery application can help shipping carriers interface with online users and their shipments by sending notifications of shipment statuses and opportunities to adjust delivery options to a user and by allowing the user to adjust or change authorized recipients. For example, if the user is not home, but his wife is home, the user can designate his wife as the authorized recipient. The shipping delivery application 196 may store the user's preset delivery preferences, such as home or work address, to transmit to a shipping carrier when needed. Delivery preferences may also indicate that the user can accept delivery at random locations. For example, the user may be notified, such as through the user's mobile device, that the delivery is on route to the user's home. Because the user does not expect to be home, the user may then request the shipping carrier to meet the user at a nearby coffee shop that may be on an approved stop for the shipping carrier. This ensures timely delivery with little or no inconvenience to either the user or the shipping carrier.

In other embodiments, the shipping delivery application 196 allows a user 102 to have items shipped from a merchant without providing the user's address. The merchant 130 may receive a request for a product from user 102. The merchant 130 may send the product to a shipping carrier, who in turn contacts the service provider to receive the delivery address of the user 102. In one embodiment, the merchant sends the product to the service provider, who already has the delivery address of the user 102.

A shipping carrier server 140 may be in communication with the merchant 130, service provider 180, and/or the user 102. The shipping carrier server 140 includes a shipping carrier application 142 to receive shipping information from the merchant 130 and visual identification of an authorized receiver from service provider server 180. In various embodiments, the shipping carrier application 142 allows the user 102 to determine the status of a shipment for an item associated with an order placed by the user 102.

Figure 2:
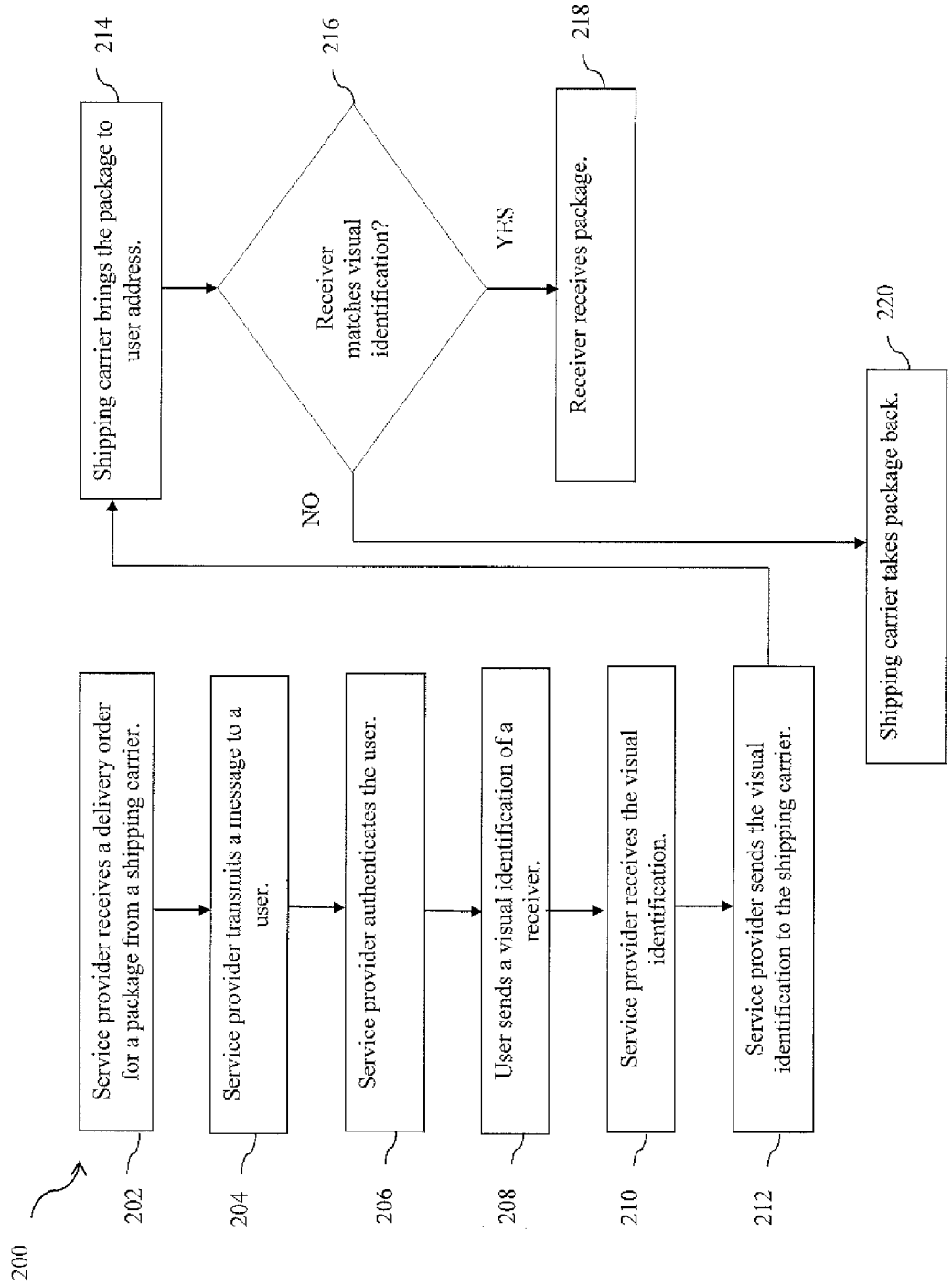
FIG. 2 is a flowchart showing a method for facilitating delivery of a package according to an embodiment of the present disclosure.

Referring now to FIG. 2, a flowchart of a method 200 for facilitating delivery of a package is illustrated according to an embodiment of the present disclosure. The user 102 places an order for an item online and requests that a signature be obtained upon delivery. The merchant 130 receives the purchase request and payment for the item. In one embodiment, payment is provided by the service provider server 180. The merchant 130 sends item and shipment information to the shipping carrier server 140, who then sends this information to service provider server 180.

At step 202, the service provider 180 receives the order from the shipping carrier server 140. The order may contain certain information such as the user's contact information, the seller's contact information, the shipping carrier's contact information, an identification of the item, the transaction amount for the item, expected time of delivery, and a requirement for a signature at the time of delivery.

At step 204, the service provider server 180 transmits a message to user 102, to inform him or her to expect a delivery and that a signature is required. In one embodiment, the message includes a request for visual identification of an authorized receiver of the item.

At step 206, the user 102 accesses a service provider site via the user device 120, and logs in to his or her account. The user provides identifying data, e.g., user name, password, answers to security questions, etc., and is authenticated by the service provider. The user 102 is now "checked-in."

Once the user 102 has checked-in to the site, the user 102 may track the location of the package, and the site may provide information on the expected delivery time, along with the physical address where the delivery is to be made. In some embodiments, the user 102 can change or update the physical delivery address based on expected delivery time, or based on convenience. For example, the user 102 may determine that the best delivery address at 3 PM is his or her business address, but the expected delivery time is 5 PM so the user 102 changes the delivery address to his or her home address. In another example, the user 102 decides that he or she wants to surprise a friend with a gift and changes the delivery address from his or her own address to the address of the friend. In various embodiments, the user 102 can even delay delivery of the package to a more suitable time. For instance, the user 102 may be out of town or on vacation when a package is to be delivered. The user 102 can have the package delivered at a later date, e.g., after he or she is back in town.

In other embodiments, the user 102's geo-location can be tracked upon checking-in so that the shipping carrier can determine the best place for delivery. Both the user 102's location and the shipping carrier's location can be updated in real-time so that a mutually convenient location for the user 102 and shipping carrier to meet can be determined.

At step 208, the user 102 sends a visual identification of an authorized receiver of the package to the service provider. The visual identification may be in the form of a picture, a video, or a combination thereof. The visual identification should include at least a recent and clear image of the face of the authorized receiver so that the shipping carrier can readily recognize and identify the receiver. In some embodiments, the service provider server 180 may reject the provided visual identification if the image is unclear or blurry, and request another form of visual identification from the user 102. In various embodiments, the user 102 can change the authorized recipient of the package and the visual identification of the authorized receiver based on location of the package and expected delivery time.

At step 210, the service provider server 180 receives the visual identification, and at step 212, the service provider transmits the visual identification to the shipping carrier server 140. In one embodiment, the service provider server 180 stores the visual identification in a user account of the user 102.

When the shipping carrier brings the package to a physical address at step 214, the shipping carrier compares the visual identification to the person receiving and signing for the package at step 216. If the person matches the visual identification, the shipping carrier leaves the package with the person. If not, the shipping carrier takes the package and makes other delivery arrangements with the user 102.

Figure 3:
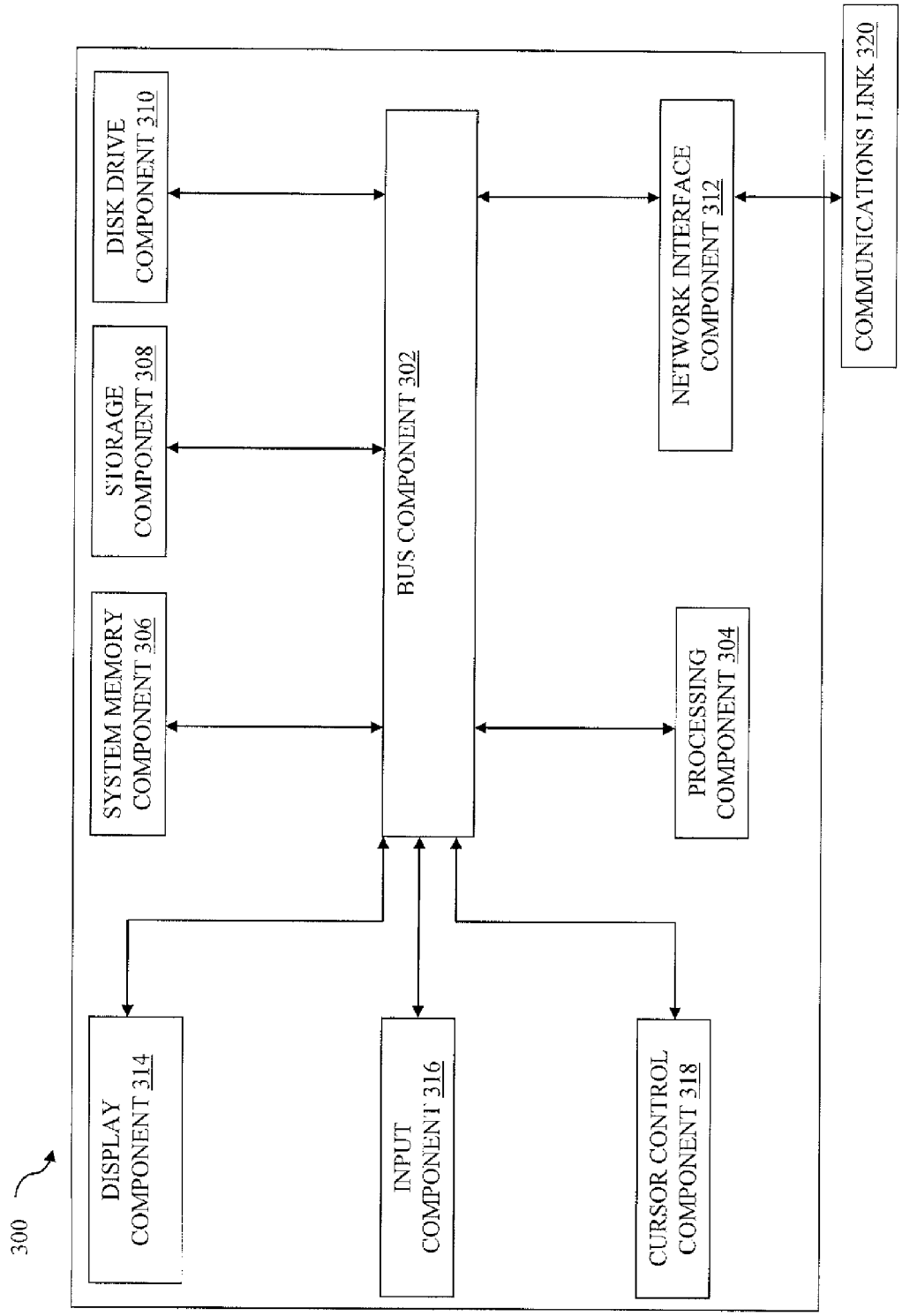
FIG. 3 is a block diagram of a system for implementing one or more components in FIG. 1 according to an embodiment of the present disclosure.

Referring now to FIG. 3, a block diagram of a system 300 is illustrated suitable for implementing embodiments of the present disclosure, including user device 120, one or more merchant servers or devices 130, and service provider server or device 180. System 300, such as part of a cell phone, a tablet, a personal computer and/or a network server, includes a bus 302 or other communication mechanism for communicating information, which interconnects subsystems and components, including one or more of a processing component 304 (e.g., processor, micro-controller, digital signal processor (DSP), etc.), a system memory component 306 (e.g., RAM), a static storage component 308 (e.g., ROM), a network interface component 312, a display component 314 (or alternatively, an interface to an external display), an input component 316 (e.g., keypad or keyboard), and a cursor control component 318 (e.g., a mouse pad).

In accordance with embodiments of the present disclosure, system 300 performs specific operations by processor 304 executing one or more sequences of one or more instructions contained in system memory component 306. Such instructions may be read into system memory component 306 from another computer readable medium, such as static storage component 308. These may include instructions to process financial transactions, make payments, receive and transmit visual identifications, etc. In other embodiments, hard-wired circuitry may be used in place of or in combination with software instructions for implementation of one or more embodiments of the disclosure.

Logic may be encoded in a computer readable medium, which may refer to any medium that participates in providing instructions to processor 304 for execution. Such a medium may take many forms, including but not limited to, non-volatile media, volatile media, and transmission media. In various implementations, volatile media includes dynamic memory, such as system memory component 306, and transmission media includes coaxial cables, copper wire, and fiber optics, including wires that comprise bus 302. Memory may be used to store visual representations of the different options for searching, auto-synchronizing, making payments or conducting financial transactions. In one example, transmission media may take the form of acoustic or light waves, such as those generated during radio wave and infrared data communications. Some common forms of computer readable media include, for example, RAM, PROM, EPROM, FLASH-EPROM, any other memory chip or cartridge, carrier wave, or any other medium from which a computer is adapted to read.

In various embodiments of the disclosure, execution of instruction sequences to practice the disclosure may be performed by system 300. In various other embodiments, a plurality of systems 300 coupled by communication link 320 (e.g., network 160 of FIG. 1, LAN, WLAN, PTSN, or various other wired or wireless networks) may perform instruction sequences to practice the disclosure in coordination with one another. Computer system 300 may transmit and receive messages, data, information and instructions, including one or more programs (i.e., application code) through communication link 320 and communication interface 312. Received program code may be executed by processor 304 as received and/or stored in disk drive component 310 or some other non-volatile storage component for execution.

In view of the present disclosure, it will be appreciated that various methods and systems have been described according to one or more embodiments for facilitating delivery of a package to a user.

Although various components and steps have been described herein as being associated with user device 120, merchant server 130, shipping carrier server 140, and service provider server 180 of FIG. 1, it is contemplated that the various aspects of such servers illustrated in FIG. 1 may be distributed among a plurality of servers, devices, and/or other entities.

Where applicable, various embodiments provided by the present disclosure may be implemented using hardware, software, or combinations of hardware and software. Also where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the spirit of the present disclosure. In addition, where applicable, it is contemplated that software components may be implemented as hardware components, and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A package delivery system of a service provider, comprising:
   a non-transitory memory storing user account information; and
   one or more hardware processors coupled to the non-transitory memory and configured to cause the system to perform operations comprising:
      receiving, by the service provider from a shipping carrier, an order to deliver an item purchased by a user, the order including a signature requirement and excluding a delivery address;
      in response to receiving the order without the delivery address, transmitting, by the service provider to the shipping carrier, the delivery address;
      transmitting, by the service provider to a device of the user, a message informing the user to expect a delivery of the item, the message requesting a visual identification of an authorized receiver of the item;
      receiving, from the user, login information that is responsive to the transmitted message;
      in response to receiving the login information, authenticating the user and providing access to an account in a service provider site associated with the user;
      providing, to the user on the service provider site, an expected delivery time for the item;
      receiving, by the service provider from the device of the user based on the expected delivery time, the visual identification of the authorized receiver; and
      transmitting, by the service provider to the shipping carrier, the visual identification of the authorized receiver.

2. The system of claim 1, wherein the user and the authorized receiver are identical.

3. The system of claim 2, wherein the operations further comprise tracking a location of the device of the user and transmitting location information of the device of the user to the shipping carrier.

4. The system of claim 1, wherein the visual identification comprises a picture, video, or combination thereof.

5. The system of claim 1, wherein the operations further comprise receiving a change in delivery address from the device of the user and transmitting the change to the shipping carrier.

6. The system of claim 1, wherein the operations further comprise receiving, from the device of the user, a change in the visual identification of the authorized receiver.

7. The system of claim 1, wherein the operations further comprise receiving, from the device of the user, a change in the authorized receiver of the item.

8. A method for facilitating delivery of a package, comprising:
   receiving, by one or more hardware processors of a service provider from a shipping carrier, an order to deliver an item purchased by a user, the order including a signature requirement and excluding a delivery address;
   in response to receiving the order without the delivery address, transmitting, by the one or more hardware processors of the service provider to the shipping carrier, the delivery address;
   transmitting, by the one or more hardware processors of the service provider to a device of the user, a message informing the user to expect a delivery of the item, the message requesting a visual identification of an authorized receiver of the item;
   receiving, from the user, login information that is responsive to the transmitted message;
   in response to receiving the login information, authenticating the user and providing access to an account in a service provider site associated with the user;
   providing, by the one or more hardware processors of the service provider to the user on the service provider site, an expected delivery time for the item;
   receiving, by the one or more hardware processors of the service provider from the device of the user based on the expected delivery time, the visual identification of the authorized receiver; and
   transmitting, by the one or more hardware processors of the service provider to the shipping carrier, the visual identification of the authorized receiver.

9. The method of claim 8, wherein the user and the authorized receiver are identical.

10. The method of claim 9, further comprising tracking, by the one or more hardware processors of the service provider, a location of the device of the user and transmitting, by the one or more hardware processors of the service provider, location information of the device of the user to the shipping carrier.

11. The method of claim 8, wherein the visual identification comprises a picture, video, or combination thereof.

12. The method of claim 8, further comprising receiving, by the one or more hardware processors of the service provider, a change in delivery address from the device of the user and transmitting, by the one or more hardware processors of the service provider, the change to the shipping carrier.

13. The method of claim 8, further comprising receiving, by the one or more hardware processors of the service provider from the device of the user, a change in the visual identification of the receiver.

14. The method of claim 8, further comprising, receiving by the one or more hardware processors of the service provider from the device of the user, a change in the authorized receiver of the item.

15. A non-transitory machine-readable medium having stored thereon machine-readable instructions executable to cause a machine of a service provider to perform operations comprising:
- receiving, by the service provider from a shipping carrier, an order to deliver an item purchased by a user, the order including a signature requirement and excluding a delivery address;
- in response to receiving the order without the delivery address, transmitting, by the service provider to the shipping carrier, the delivery address;
- transmitting, by the service provider to a device of the user, a message informing the user to expect a delivery of the item, the message requesting a visual identification of an authorized receiver of the item;
- receiving, from the user, login information that is responsive to the transmitted message;
- in response to receiving the login information, authenticating the user and providing access to an account in a service provider site associated with the user;
- providing, to the user on the service provider site, an expected delivery time for the item;
- receiving, by the service provider from the device of the user based on the expected delivery time, the visual identification of the authorized receiver; and
- transmitting, by the service provider to the shipping carrier, the visual identification of the authorized receiver.

16. The non-transitory machine-readable medium of claim 15, wherein the visual identification comprises a picture, video, or combination thereof.

17. The non-transitory machine-readable medium of claim 15, wherein the operations further comprise receiving, from the device of the user, a change in delivery address and transmitting the change to the shipping carrier.

18. The non-transitory machine-readable medium of claim 15, wherein the operations further comprise receiving, from the device of the user, a change in the visual identification of the authorized receiver.

19. The non-transitory machine-readable medium of claim 15, wherein the operations further comprise tracking a location of the user and transmitting, by the service provider, location information of the user to the shipping carrier.

20. The non-transitory machine-readable medium of claim 15, wherein the operations further comprise receiving, from the device of the user, a change in the authorized receiver of the item.

* * * * *